April 27, 1965  J. DI DOMENICO ET AL  3,180,521

ROTARY DISPENSER

Filed April 8, 1963  3 Sheets-Sheet 1

Inventors:
Joseph Di Domenico,
Frank Mellion,
by Salter & Michaelson
Attys.

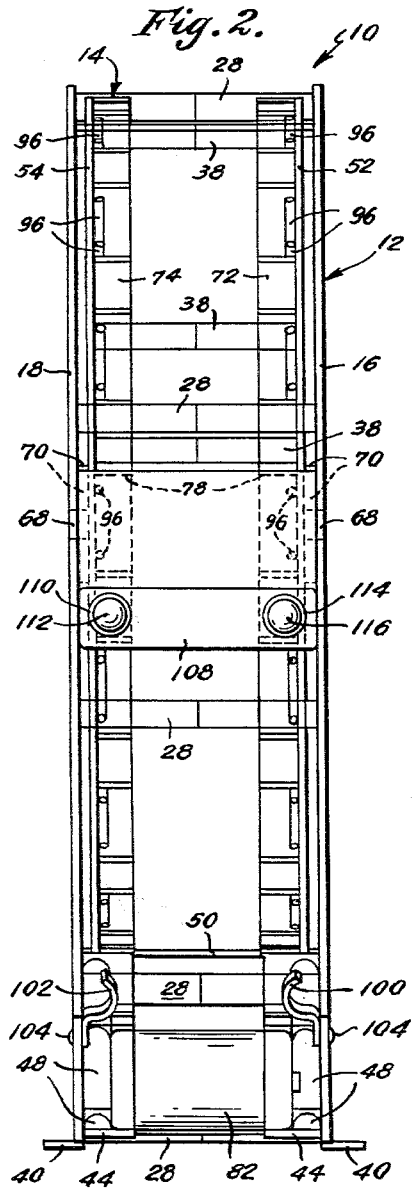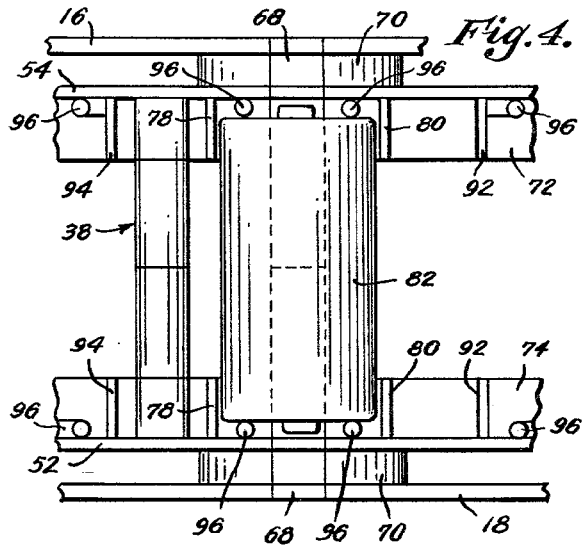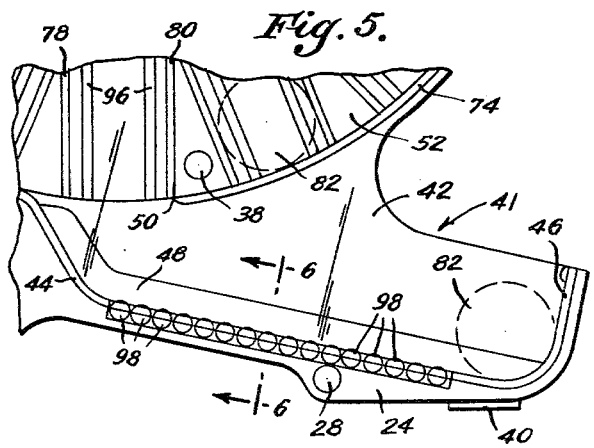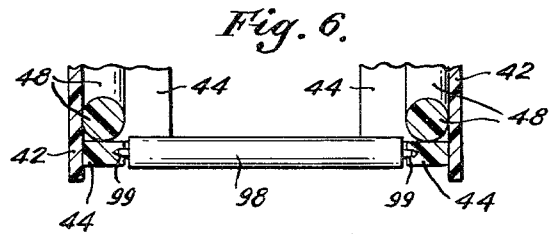
Inventors:
Joseph Di Domenico,
Frank Mellion,
by Salter + Michaelson
Attys.

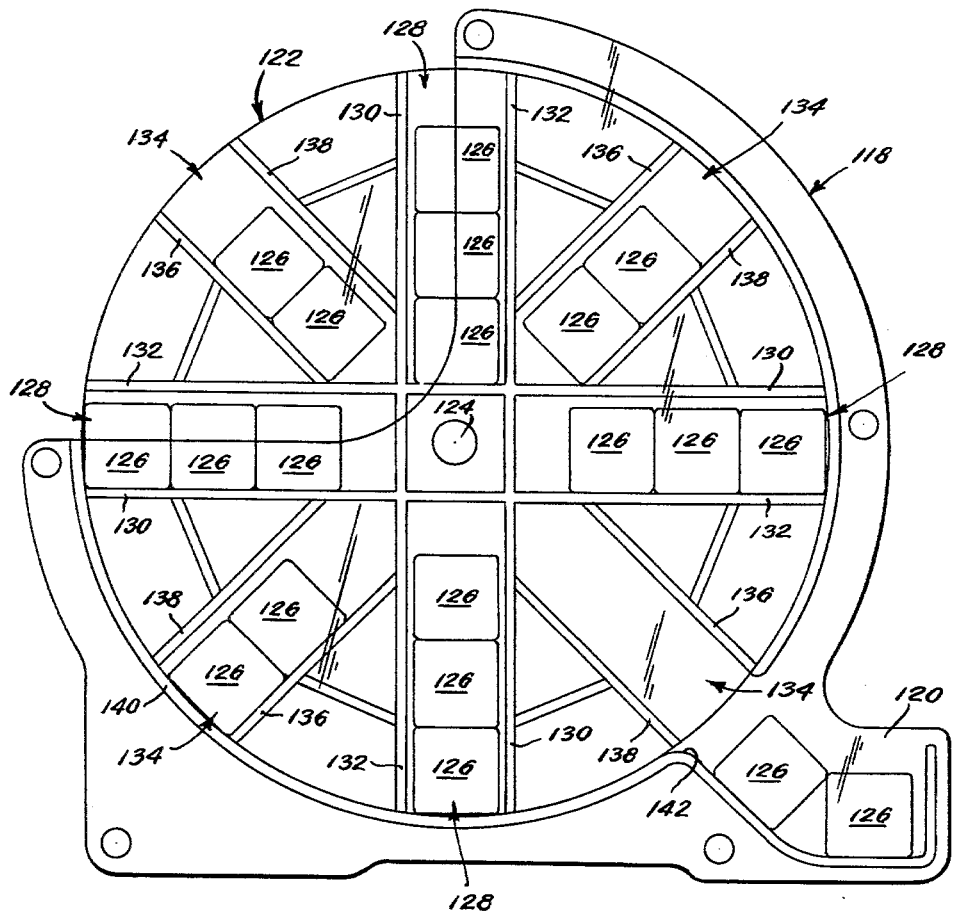

United States Patent Office 3,180,521
Patented Apr. 27, 1965

3,180,521
ROTARY DISPENSER
Joseph Di Domenico and Frank Mellion, Providence, R.I., assignors to Jo-Dee Corp., Providence, R.I., a corporation of Rhode Island
Filed Apr. 8, 1963, Ser. No. 271,281
15 Claims. (Cl. 221—105)

The present invention relates to a rotary dispenser. More particularly, the present invention relates to a device for dispensing small elongated articles wherein a rotary dispensing wheel is provided that includes a plurality of radially extending pockets in which the articles to be dispensed are carried.

The rotary dispenser embodied in the present invention has particular application in the dispensing of small elongated articles, such as dry cell batteries or the like, although it will be understood that other articles may be dispensed therefrom, and as will be described hereinafter in connection with a modification of the invention, small boxes are one form of alternate element that may be dispensed from a device embodying the concept of the present invention.

The rotary dispenser embodied herein includes a unique constructional arrangement of a dispensing wheel that is mounted within a housing such that the axis thereof is horizontal. The dispensing wheel which resembles a ferris wheel in appearance is defined by a pair of spaced plates that are disposed in substantially vertical planes and that are secured in spaced apart relation by a plurality of horizontally extending spacing rods. Formed between the plates are a plurality of radially extending pockets that are defined by a plurality of parallel tracks that are secured to the inside surfaces of the spaced plates. The articles to be dispensed are slidably received within the pockets in horizontal relation and are retained on the tracks as the dispensing wheel is rotated. The periphery of the dispensing wheel is open, thereby exposing the pockets therein; however, the housing in which the dispensing wheel is mounted, conforms generally to the configuration of the dispensing wheel, and includes guard rails that overlie a portion of the open periphery of the dispensing wheel to prevent the articles within the pockets from rolling free therefrom as the dispensing wheel is rotated. Located at the lowermost end of the housing is a discharge chute that is inclined with respect to the horizontal and that communicates with the dispensing wheel through slots formed in the guard rails. Thus, as the dispensing wheel rotates, each of the elongated articles is moved into communication with the discharge chute through the slot formed in the guard rails. The elongated articles then roll to the bottom of the discharge chute for dispensing as desired.

Since the dispenser of the present invention, has particular application in the dispensing of small dry cell batteries, it is desirable to test the effectiveness of each battery as it is removed from the dispensing chute. For this purpose, a battery testing device is incorporated with the housing so that as each battery is removed from the unit, it will be tested for the effectiveness thereof. As will be described hereinafter, the testing device includes a pair of spaced contacts that are adapted to be bridged by a battery that is to be removed from the dispenser. Electrically communicating with the contacts is a lamp that is mounted on the dispenser housing and that will be illuminated as the battery is removed from the dispenser, provided the battery is still effective.

It is, therefore, an object of the present invention to provide a rotary dispenser that is used for the dispensing of small elongated articles therefrom.

Another object of the invention is to provide a rotary dispenser, the axis of which is horizontal, and that includes a plurality of radially extending pockets that are adapted to slidably receive a plurality of articles therein for the dispensing therefrom.

Still another object is to provide a rotary dispenser for the dispensing of small dry cell batteries that includes means for testing each of the batteries as it is removed from the dispensing device.

Still another object is to provide a lamp test jack for use with the battery test equipment that is mounted on the dispenser housing.

Still another object is to provide a dispenser that is rotatably mounted in a housing and that includes a plurality of radially extending pockets that are adapted to slidably receive a plurality of articles in horizontal relation therewith, the rotary dispenser being adapted to move each of the articles to a dispensing station for the removal therefrom.

Other objects, features and advantages of the invention will become apparent as the description thereof proceeds when considered in connection with the accompanying illustrative drawings.

In the drawings which illustrate the best mode presently contemplated for carrying out the present invention:

FIG. 2 is a front elevational view of the rotary dispenser illustrated in FIG. 1;

FIG. 4 is a sectional view taken along lines 4—4 in FIG. 1;

FIG. 5 is a fragmentary elevational view of the discharge chute showing a modified form of track therein;

FIG. 6 is a sectional view taken along lines 6—6 in FIG. 5; and

FIG. 7 is a side elevational view of a modified form of the dispenser for use in dispensing small rectangular articles.

Referring now to FIGS. 1 through 6, the preferred form of the invention is illustrated and, as shown, the dispenser embodied therein is adapted to contain and dispense a plurality of small elongated articles. As will be described hereinafter, the elongated articles to be dispensed may be small dry cell batteries that are cylindrical in construction and that conform to the configuration of the discharge pockets of the dispensing wheel to be described. It will be understood, however, that elongated articles other than dry cell batteries may be contained and dispensed by the rotary dispenser. In this connection it will be noted that in the modified form of the invention illustrated in FIG. 7, the concept of the invention also contemplates the dispensing of articles other than a cylindrical configuration, and such articles may be oblong in shape, such as small boxes or packages.

Figure 1:
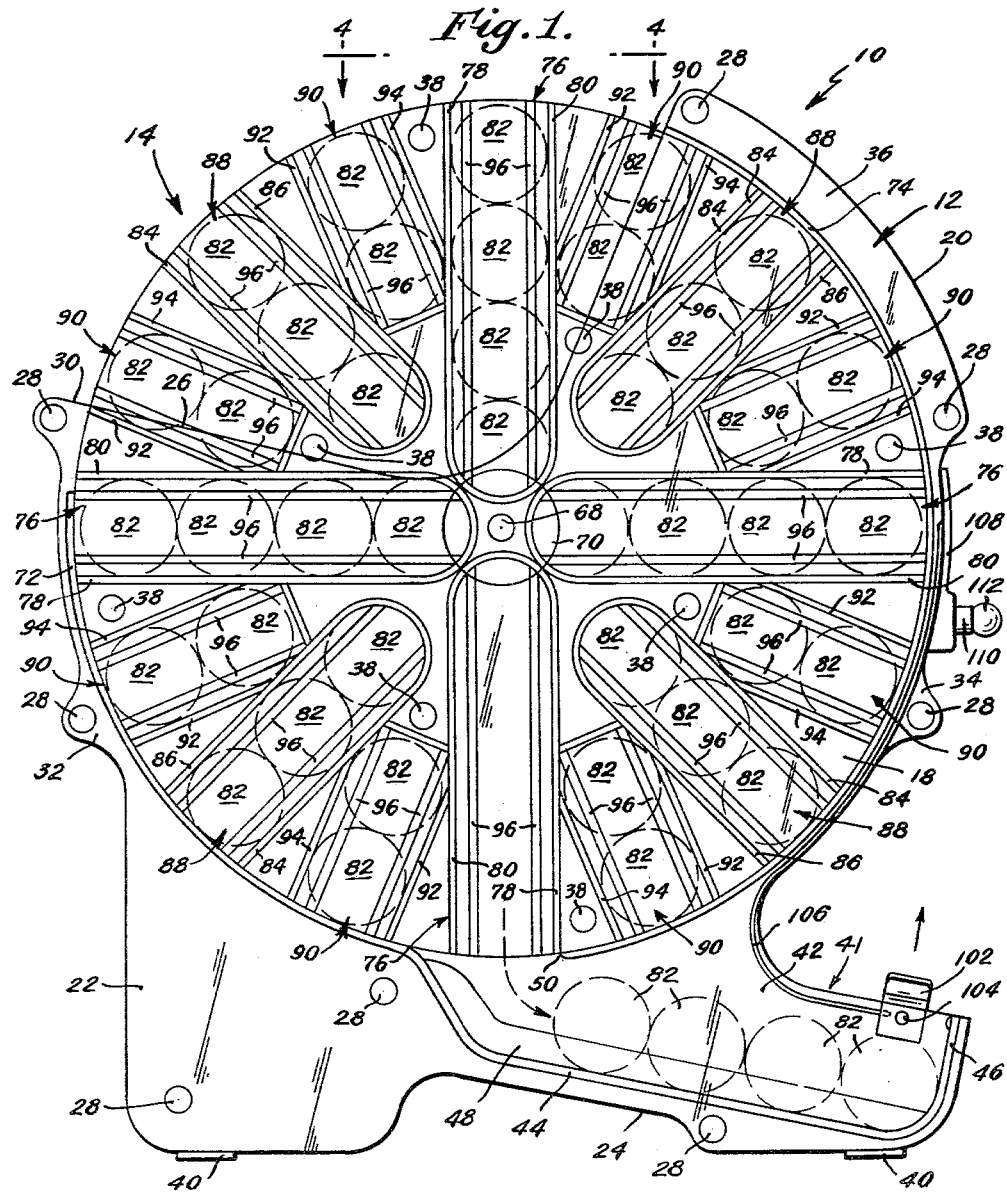
FIG. 1 is a side elevational view of the preferred form of the rotary dispenser embodied herein.

Referring again to FIGS. 1 through 6, the rotary dispenser embodied herein is generally indicated at 10 and includes a housing generally indicated at 12 and a dispensing wheel rotatably mounted in the housing 12 and generally indicated at 14. As shown in FIGS. 1 and 2, the housing 12 includes a pair of walls 16 and 18 that are substantially vertical and that are disposed in spaced apart relation. The housing walls 16 and 18 are identical in configuration, each wall including an upper portion 20 that is generally circular in configuration and a lower portion that is formed in a foot-like configuration defined by a rear or heel portion 22 and a front or toe portion 24. As will be described hereinafter, the spaced apart toe portions 22 of the parallel walls 16, 18 cooperate to define a discharge or dispensing chute into which the articles to be dispensed carried by the dispensing wheel 14 are directed.

The circular upper portion 20 of each wall 16 and 18 is cut away to define a pie-shaped cutout portion indicated at 26, the cutout portion 26 of the spaced walls cooperating to define a loading area through which the articles to be dispensed are inserted into the dispensing wheel 14. As illustrated in FIG. 1 the cut portion 26 of each wall extends approximately 90° of the circular portion of the housing walls, although this cutout portion may be somewhat reduced if desired.

Figure 3:
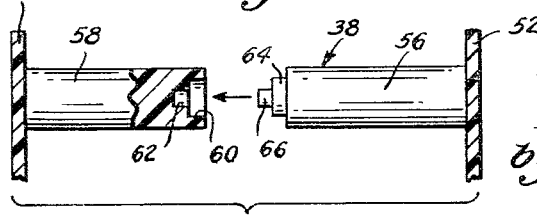
FIG. 3 is an exploded view in elevation with parts shown in section of one of the spacer rods that connect the walls of the housing and the discs of the dispensing wheel.

In order to secure the walls 16 and 18 of the housing 12 in spaced apart relation, a plurality of spacer rods 28 are provided and are joined to the inside surfaces of the housing walls. As shown in FIG. 1, the wall 18 is formed with the projecting portions 30, 32, 34 and 36, that extend beyond the periphery of the dispensing wheel 14 and cooperates with the corresponding opposed projecting portion to locate a spacer rod 28 therebetween. The spacer rods 28 also extend through the heel portion and toe portions 22, 24 of each wall to locate the walls 16 and 18 in spaced-apart position. Although the spacer rods 28 may be formed in one piece construction, they are preferably formed in a two-piece construction so as to facilitate the assembly of the housing. As will be described, the dispensing wheel 14 also includes spacer rods indicated at 38 that are similar to the spacer rods 28 and as shown in FIG. 3, these spacer rods 38 are also joined in a two-piece construction similar to spacer rods 28. A more complete description of the spacer rod will follow hereinafter in connection with the description of the dispensing wheel 14.

As mentioned hereinabove, the lower portion of the housing 12 is formed in a generally foot-like configuration and is defined by the rear or heel portion 22 and the forward or toe portion 24. This lower portion of the housing 12 defines a stand which is further stabilized by feet 40 that are joined to the heel and toe portions 22, 24 on both sides of the walls 16 and 18.

The toe portions 24 of the housing walls also define a dispensing chute generally indicated at 41 which as illustrated in FIG. 1, is formed by a vertical wall 42 of each of the toe portions 24. Joined to each of the walls 42 of the dispensing chute 41 at the lowermost end thereof is a narrow inclined track 44, the tracks 44 of each wall being spaced from each other. The outermost end of the tracks 44 turn upwardly to form a substantially vertical wall or stop 46 that locates the outermost of the articles to be dispensed at a dispensing position. Joined to each of the tracks 44 in overlying relation are inclined guide rods 48 that extend from the outwardly turned wall or stop 46 to a point adjacent the lowermost end of the dispensing wheel 14. As will be described, the guide rods 48 are provided for receiving the terminals of dry cell batteries in rolling relation thereon when the batteries are the articles being dispensed by the device. As will be further described hereinafter, the dispensing chute into which the article to be dispensed are discharged communicates with the dispensing wheel 14 by means of a slot that permits the articles to drop from the pockets of the dispensing wheel 14 into the dispensing chute 41. As illustrated in FIG. 1, this slot is indicated at 50 and will be more completely described in connection with the description of the dispensing wheel 14.

The dispensing wheel 14 includes spaced plates 52 and 54 that are located in parallel relation with respect to each other and with respect to the walls 16 and 18 of the housing 12. The spaced plates 52, 54 of the dispensing wheel 14 are generally circular in configuration and are retained in spaced-apart relation by the spacer rods 38, one of which is illustrated in FIG. 3. As illustrated in FIG. 3, the spacer rods 38 are preferably formed in a two-piece construction, one of which defines a male member indicated at 56, and the other of which defines a female member indicated at 58. The female member 58 of the spacer rod 38 is joined to the inside surface of the plate 54 at one end thereof and is formed with a recess 60 which communicates with an interior cavity 62 of smaller diameter. The male member 56 of the spacer rod 38 is joined to the adjacent inside surface of the plate 52 on one end thereof and is formed with a reduced end 64 on which a projection 66 is formed. It is seen that when the male and female members 56, 58 are joined together, the projection 66 extends into the cavity 62 and the reduced end 64 is received within the recess 60. As mentioned hereinabove, the two-piece construction of the spacer rods 38 provides for convenient assembly of the dispensing wheel 14, it being further understood that the spacer rods 28 of the housing 12 are formed in a manner similar to that just described in connection with the spacer rods 38.

The dispensing wheel 14 is mounted for rotation within the housing 12, the axis of rotation of the dispensing wheel being generally horizontal. For the purpose of mounting the dispensing wheel 14 for rotation about the horizontal axis thereof, a shaft 68 is provided and extends through the plates 52 and 54 and further extends through the walls 16 and 18 of the housing 12. In order to properly space the dispensing wheel plates 52 and 54 from the inside surfaces of the housing walls 16 and 18, small discs 70 are mounted on the shaft 68 between each housing wall and the adjacent dispensing wheel plate; the relationship of the spacer discs 70 with respect to the housing walls and dispensing wheel plates being more clearly shown in FIG. 4. Although not illustrated, it is contemplated to eliminate the shaft 68 and secure a flange and stub shaft construction to the inner surface of each of the housing walls. The opposed stub shafts would define the axis of the housing and would further define a horizontal axis of the dispensing wheel. The dispensing wheel would be secured to the stub shafts by forming central openings in the housing plates 52 and 54 that would receive the stub shafts therein. This construction would be identical in principle to that described above insofar as the mounting of the dispensing wheel 14 with respect to the housing 12 is concerned. The difference in the construction of the alternate form of shafts arrangement would be the elimination of the shaft 68 that normally extends through the spaced plates of the dispensing wheel.

As seen in FIG. 1, it will be noted that the dispensing wheel 14 is mounted in the housing 12 such that the extensions 30, 32, 34 and 36 project beyond the periphery of the dispensing wheel plates 52, 54. This arrangement provides for the convenient mounting of the spacer rods 28 and further provides for locating spaced arcuate shaped guard rails 72 and 74 that are joined to the housing plates on the inside surface thereof and that are generally parallel to and spaced from the outer periphery of the plates 52, 54. As will be described hereinafter, the guard rails 72 and 74 prevent the articles located in the pockets of the dispensing wheel from being prematurely discharged as the dispensing wheel is rotated and thus act to enclose the dispensing wheel pockets for retaining the articles therein during rotation of the dispensing wheel. The guard rails 72, 74 extend substantially around the circular formation of the upper portion 20 of the housing walls but are interrupted at the lowermost ends thereof to define the slots 50. The slots 50 that are thus formed in the guard rails 72, 74 define a discharge point for the articles located in the pockets of the dispensing wheel 14 and provide for the discharge of the articles therethrough into the dispensing chute 41.

The dispensing wheel 14 is adapted to carry a plurality of elongated articles therein wherein the articles are disposed such that the longitudinal axes thereof are horizontal. As mentioned hereinabove, the dispensing device has particular application in the dispensing of small dry cell batteries. It will be seen, therefore, that the batteries must be located such that the axes thereof are horizontal if they are to be properly dispensed into the dispensing chute 41 located at the lowermost end of the housing 12. In order to locate the dry cell batteries in proper position in the dispensing wheel 14, a plurality of radially extending pockets are formed between the plates 52 and 54 of the dispensing wheel 14. The space between the plates 52 and 54 is substantially open so that the periphery of the dispensing wheel 14 is exposed for the discharge of the batteries therefrom as each of the pockets of the dispensing wheel 14 reaches the discharge slots 50 at the lowermost end of the housing. In order to form the radially extending pockets such that the periphery of the dispensing wheel is exposed, a plurality of parallel tracks are secured to the inside surfaces of the opposed dispensing wheel plates 52, 54. The parallel tracks that define the radially extending pockets have a predetermined length that is dependent upon the position thereof so as to provide for the maximum capacity of the articles to be dispensed. In the dispensing wheel 14 of the present invention, the radially extending pockets are formed in three basic dimensions for defining three different forms of pockets, each pocket having a different capacity for receiving the articles to be dispensed therefrom.

Referring particularly to FIG. 1, a plurality of pockets of maximum capacity are generally indicated at 76, the pockets 76 being disposed in opposed diametrical relation and extending from the periphery of the plates 52, 54 to a point adjacent the axis of the dispensing wheel 14. The pockets 76 are defined by parallel tracks 78 and 80 that are joined to the inside surfaces of both the plates 52 and 54. The parallel tracks 78 and 80 of the plates 52 are spaced from the parallel tracks 78 and 80 that are joined to the plate 54, the pockets 76 thus in effect being open in the middle thereof. As will be seen in FIG. 1, the pockets 76 are formed of such a length and configuration so as to receive four of the articles to be dispensed therein. Each of the articles is shown in phantom in the drawing and is indicated as a cylindrical battery 82. In order to accommodate the cylindrical configuration of the batteries 82, the tracks 78 and 80 are curved into adjoining relation at the innermost ends thereof. It will be understood that the innermost ends of the tracks 78 and 80 can be formed in any convenient configuration to accommodate the article that is to be dispensed.

Also joined to the inside surfaces of the dispensing wheel plates 52, 54 are a plurality of parallel plates 84, 86, these plates being disposed radially with respect to the axis of the housing but intermediate the pockets 76. As indicated, the parallel plates 84, 86 define pockets of intermediate capacity generally indicated at 88. The tracks 84, 86 are also joined to the plates 52, 54 in spaced relation, each pair of tracks 84, 86 being joined in curved relation at the innermost ends thereof to accommodate the cylindrical batteries 82 therein. It will be noted that the pockets 88 are adapted to receive three of the batteries 82 in horizontal relation therein.

The pockets of minimum capacity are generally indicated at 90 and are defined by pairs of parallel tracks 92 and 94 that are secured to the inside surfaces of the plates 52, 54 between pockets 76 and 88. It will be noted that the pockets 90 which are of minimum capacity contain two of the dry cell batteries 82 therein.

Although it is contemplated to dispose the various pockets in any desired relation, in the present invention, each of the pockets of maximum capacity 76 is disposed such that it is 90° from the next adjacent pocket 76. The pockets 88 of intermediate capacity are located intermediat the pockets 76 or approximately 45° removed therefrom. The pockets 90 of minimum capacity are located intermediate the pockets 76 and 88 or are approximately spaced 22½° therefrom.

Since the pockets 76, 88 and 90 are adapted to receive the dry cell batteries 82 therein, it is desirable to provide a bearing surface for the terminals of the batteries that are located on the outer ends thereof. For this purpose, parallel guide rods 96 are secured to the inside surfaces of the plates 52, 54, and between the various tracks of the pockets in parallel relation with respect thereto. As seen in FIG. 5, the battery 82 is centrally disposed with respect to the pocket 76 in which it is located. In this position, the opposed terminals of the battery are also centrally located with respect to the adjacent guide rods 96. However, as the dispensing wheel 14 rotates, the battery 82 in FIG. 5 located at the uppermost end of the dispensing wheel will move by gravity in contacting relation with respect to either the tracks 78 or 80, depending upon the direction of rotation of the dispensing wheel. Further, as the dispensing wheel is rotated, the opposed terminals of the battery will move into engagement with a set of the guide rods 96, the guide rods contacted by the battery terminals being determined by the direction of rotation of the dispensing wheel 14.

In the description of the various elements and members of the housing and dispensing wheel that define the rotary dispenser of the present invention, no specific reference was made to a material or to the manner of attachment of these elements and members. In the preferred form of the invention, all of the elements as described are formed of a plastic material, and it is further contemplated to employ a clear plastic material so as to enhance the ornamental characteristics of the dispenser. Since a plastic material is utilized, the various elements, parts and components are secured to each other by any suitable adhesive or the like. As is well known in the art, the plastic material may also be heated to seal the various elements, parts and components to each other. Whenever possible, the various elements, parts and components are molded or may be machined as desired.

As described hereinabove, the tracks 44 of the dispensing chute 41 are adapted to receive articles to be dispensed such as the batteries 82 as they are discharged through the slots 50 from the dispensing wheel pockets. The tracks 44 are inclined to provide for rolling movement of the batteries 82 to the outermost end or stop 46 of the dispensing chute 41. In order to decrease the frictional contact of the tracks 44 as the batteries 82 roll thereon, it is contemplated to employ a plurality of horizontally extending rollers 98 in the dispensing chute, such as indicated in FIG. 5. The rollers 98 are provided with pins 99 on the outermost ends thereof that extend into the sides of the tracks 44 thereby rotatably mounting the rollers 98 between the tracks. This relationship is particularly shown in FIG. 6 and it will be observed that the rollers 98 span the space between the tracks 44, this space being normally open in the form of the invention illustrated in FIGS. 1 and 2. The rollers 98 are secured between the tracks 46 in stepped vertical relation so as to conform to the inclination of the tracks 44 and it will be seeen that as the batteries 82 are discharged from the dispensing wheel pockets through the slots 50, they will roll freely down the dispensing chute to the end thereof. The rollers 98 thus tend to reduce the frictional drag therebetween and the batteries rolling thereover.

Since the rotary dispenser of the present invention has particular application in the dispensing of small dry cell batteries, it is desirable to test the effectiveness of each battery as it is dispensed from the device. For this purpose, a testing device is incorporated in the dispenser and includes spaced contacts 100, 102, that are joined to the walls 42 of the dispensing chute 41. As seen in FIG. 1, the contacts 100, 102 are secured to the uppermost end of the walls 42 adjacent the stop 46 and thus are normally out of contact with the battery disposed at the outermost end of the dispensing chute and in engagement with the upwardly extending stop 46. The contacts 100, 102 may be secured to the walls 42 in any convenient fashion, such as by rivets one of which is indicated at 104. Each of the contacts is formed with an inwardly turned portion shown in FIG. 2 that acts as a spring contact for producing the proper electrical connection when the battery being dispensed is moved into engagement therewith. Electrically connected to each of the contacts 100, 102 is a wire lead 106 that extends upwardly through the housing walls and into a mounting plate 108. The mounting plate 108 may be formed of a metallic material or may be formed of a plastic material and have a metal contact plate located therein. The contact plate within the mounting plate 108 spans the space between the housing walls 12 and 14 so as to be in electrical communication with the wire lead 106 projecting upwardly from the contacts 100 and 102. Located in electrical engagement with the contact plate of the mounting 108 is a socket 110 in which a lamp 112 is positioned. The lamp 112 is thus in electrical communication with the wire leads 106 and the spaced contacts 102. It is seen that as the battery located in the outermost position of the dispensing chute is removed therefrom, it must pass between the spaced contacts 102, the terminals of the battery bridging the space between the contacts to establish electrical communication therebetween. If the battery being removed is live, the lamp 112 will be illuminated, thereby attesting to the effectiveness of the battery.

It is also contemplated in the present invention to provide a lamp testing device, and for this purpose a second socket 114 is mounted on the mounting plate 108 in electrical communication with a wire lead 106. The socket 114 is disposed in parallel electrical relation with respect to the socket 110 and thus does not affect the testing of a battery and illumination of the lamp 112. The socket 114 is normally not occupied by a lamp. However, if it is desired to test a lamp, such as lamp 116 indicated in FIG. 2, a battery is moved to the uppermost position in the dispensing chute to bridge the space between the contacts 100 and 102, and the lamp to be tested is then inserted in the socket 114.

In use of the device, the articles to be dispensed, and in this case, the batteries 82, are loaded into the interiorly extending pockets of the dispensing wheel 14 by inserting them into each of the pockets 76, 88 and 90 when these pockets are disposed such that they are located in the space defined by the cutout portion 26 of the housing 12. When the wheel 14 is rotated, the batteries 88 will be prevented from rolling out of the dispensing pockets by the guard rails 72, 74 that are joined to the inner surfaces of the housing walls 16 and 18. As each of the pockets approaches the bottommost end of the housing, the outermost battery disposed in the pockets will fall through the opening defined by the slots 50 formed in the guard rails 72, 74. As each battery falls through the slot 50 into the dispensing chute 41, it will roll downwardly therein into contact with the outer wall portion or stop 46. When the dispensing chute is fully loaded as indicated in FIG. 1, the dispensing wheel 14 may be rotated without any additional discharging of the batteries 82 from the dispensing pockets. As each battery is removed from the dispensing chute and the wheel is rotated, another battery will drop through the slots 50 to maintain the discharge chute in fully loaded condition. As each battery 82 is removed from the dispensing chute, it will pass between the contacts 100 and 102 to establish electrical communication therebetween and to illuminate the lamp 12 if the battery is still effective. If desired, the lamp 116 may be inserted into the socket 114 for testing the lamp 116 while at the same time a battery is located between the contacts 100, 102.

Referring now to FIG. 7, a modified form of the invention is illustrated wherein small boxes or packages are adapted to be dispensed. In the form of the invention illustrated in FIG. 7, a housing generally indicated at 118 is provided and is generally similar to the housing 12 as described in connection with FIGS. 1 through 6. The housing 118 includes an upper portion and a lower portion in which a discharge chute 120 is defined. It will be noted that the discharge chute 120 is displaced from the lowermost end of the dispensing wheel generally indicated at 122 but is disposed such that it is less than 90° removed therefrom. The dispensing wheel 122 is mounted within the housing 118 in generally coaxial relation with respect thereto and with the axis thereof being generally horizontal. As described above, a shaft 124 extends through the dispensing wheel 122 and through the end walls of the housing 118 to rotatably mount the dispensing wheel 122 within the housing 118. Although not shown or described, suitable spacer rods are joined to the walls of the housing 118 and to the end plates of the dispensing wheel 122 to properly locate these walls in spaced-apart relation. This construction is identical to that described above in connection with the dispensing device 10. The dispensing wheel 122 also includes a plurality of radially extending dispensing pockets that receive the small articles therein for the dispensing therefrom. As illustrated in FIG. 7, the small articles are identified at 126 and may be small packages having a rectangular or square cross sectional configuration. A plurality of dispensing pockets generally indicated at 128 are formed between the plates of the dispensing wheel 122 and are defined by parallel tracks 130, 132. The dispensing pockets 128 define the pockets of maximum capacity, each pair of pockets being disposed in opposed diametrical relation. A plurality of pockets generally indicated at 134 are located intermediate the pockets 128 and are defined by parallel tracks 136 and 138 that are joined to the inner surfaces of the dispensing wheel plates.

As described above in connection with the dispensing device 10, the side walls of the housing 118 of the dispensing device illustrated in FIG. 7 are provided with guard rails 140 that prevent the discharge of the small packages 128 until the dispensing chute 120 is reached upon rotation of the dispensing wheel 122. A slot is formed in each of the guard rails 140, and is indicated at 142, the slot 142 communicating with the dispensing chute 120 and providing for discharge of the small packages 126 therethrough into the dispensing chute. Also as described above, the walls of the housing 118 are formed with a cutout portion as identified at 144 to provide for loading of the articles 126 into the pockets 128 and 134.

In use, the articles 126 are loaded into the radially extending pockets 128 and 134 and the dispensing wheel 122 is rotated. As the wheel rotates, the pockets communicate with the slots 142 formed in the guard rails 140, thereby providing for discharge of the articles 126 into the dispensing chute 120. As illustrated in FIG. 7, when a dispensing pocket communicates with the slot 142 and dispensing chute 120, an inclined surface is defined over which the articles 126 move in the discharge thereof into the dispensing chute 120.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a device for dispensing small elongated articles, a housing including spaced parallel walls, that are disposed in generally vertical planes, the lower portions of said walls defining a stand for said housing and further including an inclined discharge chute from which the articles are removed after being dispensed therein, a wheel, the axis of which is horizontally mounted for rotation in said housing between the walls thereof, said wheel including spaced plates and a plurality of radially extending pockets, each of said pockets being defined by spaced parallel radially extending tracks each of said tracks being joined to the interior surface of only one of said plates, said pockets receiving said articles therein in horizontal relation for dispensing therefrom, spacer elements joined to said plates for locating said plates in spaced-apart relation, means joined to said housing walls and overlying a major portion of the periphery of said wheel plates for preventing slidable removal of said articles from said pockets as said wheel is rotated, and a slot formed in said overlying means at the lowermost portion thereof and communicating with said discharge chute, wherein as said wheel is rotated said articles carried by said wheel are discharged through said slot and into said chute for removal therefrom.

2. In a device for dispensing small elongated articles, a housing defined by spaced parallel walls that are interconnected by a plurality of horizontally extending spacer rods, a wheel, the axis of which is generally horizontal, mounted for rotation in said housing and between said walls, said wheel including spaced-apart plates, spacers joined to said plates for locating them in spaced-apart relation, a plurality of radially extending tracks joined to said plates and defining a plurality of radial pockets in which said articles are horizontally and slidably received for dispensing therefrom, each of said pockets being defined by pairs of spaced-apart parallel tracks, means joined to said housing and overlying a major portion of the periphery of said wheel for preventing inadvertent removal of said articles from said pockets as said wheel is rotated, a slot formed in said overlying means at the lowermost portion thereof, and a discharge chute located at the lowermost end of said housing and communicating with said slot, wherein as said wheel is rotated said articles carried by said wheel in said pockets are successively discharged from said pockets through said slot and into said chute for removal therefrom.

3. In a dispensing device, a housing, a dispensing wheel mounted for rotation in said housing, said dispensing wheel including a plurality of pockets formed therein that have open communication with the periphery of said wheel and that are adapted to slidably receive a plurality of articles therein for dispensing, said housing including a discharge station located adjacent to the bottom thereof and into which said articles are discharged as said wheel is rotated, spaced guard rails joined to said housing and overlying the periphery of said wheel that is enclosed by said housing for normally retaining said articles in said pockets as said dispensing wheel is rotated and before each pocket communicates with the discharge station, and a slot formed in said guard rails at the bottom of said housing and providing for communication of each pocket with said discharge station as said dispensing wheel is rotated, wherein said articles in said pockets are discharged into said discharge station for the dispensing thereof.

4. In a dispensing device as set forth in claim 3, said wheel including spaced-apart plates, said pockets being defined by a plurality of radially extending tracks on which said articles are slidably received, said tracks being joined to the interior of said plates in parallel pairs to define said pockets.

5. In a dispensing device as set forth in claim 3, said housing being substantially open at one portion thereof to provide for loading of said articles in said pockets.

6. In a dispensing device as set forth in claim 3, said articles being dry cell batteries, and means associated with said dispensing station for testing each battery as it is dispensed from said discharge station.

7. In a dispensing device as set forth in claim 6, said testing means including spaced contacts located at said dispensing station and normally out of engagement with the battery located on the dispensing position, and a lamp holder mounted on said housing and including a lamp located in electrical communication with said contacts, whereby removal of the battery at the dispensing position causes said battery to engage said contacts and to complete a circuit to said lamp, thereby visually indicating the effectiveness of the battery being dispensed.

8. In a dispensing device as set forth in claim 7, a second lamp holder located adjacent said first named lamp holder and in parallel relation thereto with respect to the electrical connection therebetween, said second lamp holder receiving a lamp for the testing thereof simultaneously with the withdrawal of a battery from the dispensing station.

9. In a dispensing device as set forth in claim 3, at least four of said pockets extending radially inwardly from the periphery of said wheel to a point closely adjacent the axis thereof and defining pockets of maximum length, the axes of each of said pockets of maximum length being radially spaced 90° with respect to the axes of the adjacent pockets, a plurality of medium length pockets extending radially inwardly from the periphery of said wheel, the axis of each of said medium length pockets being displaced 45° from the axis of an adjacent maximum length pocket, and a plurality of minimum length pockets extending radially inwardly from the periphery of said wheel, the axis of each of said minimum length pockets being radially displaced 22.5° from the axis of an adjacent intermediate length pocket.

10. In a dispensing device as set forth in claim 3, said pockets extending radially inwardly and being shaped and proportioned for receiving small articles therein, said discharge station being displaced from the lowermost end of said housing and being located less than 90° therefrom so as to permit said small articles to be dispensed by gravity thereto as said dispensing wheel is rotated.

11. In a device for dispensing small elongated articles, a housing in which a plurality of radially extending pockets are formed for receiving said articles in horizontal slidable relation therein, a wheel mounted for rotation in said housing, said wheel including a pair of plates that are secured in spaced-apart relation by a plurality of horizontal bars, each of said plates having a plurality of spaced parallel tracks joined to the inner surface thereof, a pair of the parallel tracks of one plate cooperating with a corresponding pair of parallel tracks on the other plate to define a pocket, means joined to said housing and overlying a major portion of the periphery of said wheel for preventing discharge of said articles from said pockets as said wheel is rotated, a slot formed in said overlying means at the lowermost end thereof, and a discharge chute located at the lowermost portion of said housing and communicating with said slot, wherein as said wheel is rotated, said articles carried in said pockets are successively discharged from said pockets through said slot and into said chute for the dispensing therefrom.

12. In a device as set forth in claim 11, said housing being defined by spaced parallel vertically disposed walls that are interconnected by horizontally extending spacer rods, a portion of said walls being cut away at the top thereof to expose said pockets for the loading thereof with said articles.

13. In a device as set forth in claim 11, said chute being inclined to provide for movement of said articles to the outermost end thereof, and means located within said chute to facilitate movement of said articles therein to the outermost end thereof.

14. In a device as set forth in claim 11, wherein said articles to be dispensed are dry cell batteries, said chute being inclined to provide for rolling movement of said batteries therein to the outermost end thereof, and means mounted on said housing and including means secured to the outer end of said chute for testing each of said batteries as it is removed therefrom.

15. In a dispensing device, a dispensing wheel mounted for rotary movement with the axis thereof being generally horizontal, the dispensing wheel including a plurality of radially extending pockets that slidably receive therein a plurality of articles to be dispensed therefrom, said dispensing wheel being rotatable to successively move each of said pockets to a discharge area, wherein an article in a pocket located at said discharge area is discharged from said pocket for dispensing at a dispensing station, a housing enclosing said wheel and being defined by spaced parallel walls between which said wheel is rotatably mounted, the housing being open at the upper end thereof to provide for loading of said articles in said pockets, an inclined dispensing chute formed on the lower end of said housing and into which said articles are dispensed as said wheel is rotated, spaced guard rails joined to the walls of said housing and overlying a major portion of the periphery of said wheel for preventing premature removal of the articles in said pockets as said dispensing wheel is rotated, a slot formed in said guard rails at the lower end thereof and communicating with said dispensing chute for directing said articles to said dispensing chute as said pockets are moved into communication with said slot upon rotation of said wheel, said articles to be dispensed from said wheel being dry cell batteries, and means mounted on said housing for testing each battery as it is removed from said chute, said battery testing means including spaced contacts located at the dispensing end of said chute and normally out of engagement with the terminals of the battery disposed in the dispensing position in said chute, and a lamp holder mounted on the walls of said housing having a lamp located therein in electrical communication with said contacts, wherein removal of a battery at the dispensing station in said chute causes said battery to bridge the space between said contacts and to complete a circuit to said lamp, thereby providing a visual indication of the effectiveness of said battery.

References Cited by the Examiner

UNITED STATES PATENTS

| | | | |
|---|---|---|---|
| 1,151,711 | 8/15 | Pfleeger | 221—82 X |
| 1,489,168 | 4/24 | Spooner et al. | 221—122 X |
| 1,832,948 | 11/31 | Schmidt | 324—29.5 X |
| 2,148,143 | 2/39 | Waitzman | 221—113 X |
| 2,245,371 | 6/41 | Van Tuyl | 221—121 |
| 2,610,100 | 9/52 | Childers | 221—113 |
| 3,036,732 | 5/62 | Schaef | 221—113 |

LOUIS J. DEMBO, *Primary Examiner.*

HADD S. LANE, *Examiner.*